United States Patent [19]

Slosberg et al.

[11] Patent Number: 4,710,415

[45] Date of Patent: Dec. 1, 1987

[54] REINFORCED FOAM ANTI-FATIGUE FLOOR TILE MODULE AND METHOD OF MAKING SAME

[75] Inventors: David K. Slosberg, Atlanta; Gilbert S. Nowell, Marietta, both of Ga.

[73] Assignee: Compo Industries, Inc., Waltham, Mass.

[21] Appl. No.: 906,223

[22] Filed: Sep. 11, 1986

[51] Int. Cl.[4] .......................... B32B 3/30; B32B 5/14; B32B 5/20; B05D 3/02
[52] U.S. Cl. .................................. 428/48; 156/71; 156/79; 156/219; 427/373; 428/55; 428/95; 428/159; 428/167; 428/171; 428/309.9; 428/316.6
[58] Field of Search .............. 428/74, 158, 159, 309.9, 428/316.6, 44, 47, 48, 53, 54, 55, 56, 95, 167, 170, 171; 427/373; 156/71, 79, 219

[56] References Cited

U.S. PATENT DOCUMENTS

| | | | |
|---|---|---|---|
| 4,175,154 | 11/1979 | Faust et al. | 428/316.6 |
| 4,447,484 | 5/1984 | Slosberg et al. | 428/309.9 |
| 4,510,201 | 4/1985 | Takeuchi et al. | 428/316.6 |

FOREIGN PATENT DOCUMENTS 2019253 10/1979 United Kingdom ................ 428/74

Primary Examiner—William J. Van Balen
Attorney, Agent, or Firm—Richard P. Crowley

[57] ABSTRACT

A reinforced, anti-fatigue foam floor tile module which comprises first and second resilient foam layers, and in between the foam layers, at a distance of about 55% to 65% of the thickness from the back surface of the mat, is a dimensionally-stabilizing, fibrous, particularly glass, scrim sheet material. The foam floor tile module has a foam density ranging from about 20 to 40 pounds per cubic foot, comprises a substantially closed cell foam and has an embossed face surface having a decorative or non-slip pattern thereon with the foam layer densified under the embossed areas.

33 Claims, 2 Drawing Figures

REINFORCED FOAM ANTI-FATIGUE FLOOR TILE MODULE AND METHOD OF MAKING SAME

BACKGROUND OF THE INVENTION

Foam-type mats are commonly employed to provide cushioning and shock-absorbing surfaces for objects or people. Vinyl-foam anti-fatigue mats are often used as free lay mats employed as a standing or floor-type surface for those personnel who must stand for considerable periods of time in a confined area during the normal work periods.

A flame-resistant, vinyl-foam gasket material, particularly for use in and around electrical outlets or switch-boxes has been disclosed in U.S. Pat. No. 4,447,484, issued May 8, 1984, which patent is hereby incorporated by reference in its entirety. This patent discloses the employment of dimensionally stable glass fiber issue sheet material inwardly positioned and secured within a gasket foam layer, so as to meet particular flame test standards. Such foam gasket material is a very low density-type soft foam and quite resilient, since it must conform to irregular surfaces and is not subject to or need have abrasion-resistant properties, shock absorbing or cushioning properties. The dimensionally stable gasket material resists or prevents melting in the vinyl-foam gasket when exposed to an open flame, and therefore such gasket foam is described as a flame-resistant vinyl-foam gasket material. The fibrous tissue sheet material employed in the vinyl-foam gasket material is generally positioned anywhere within 20% to 80% of the thickness or depth of the foam material and is positioned by permitting the tissue material to penetrate to a desired level into the liquid vinyl plastisol layer prior to heating and expanding the plastisol layer to form the vinyl-foam gasket material.

SUMMARY OF THE INVENTION

The invention relates to dimensionally stable, anti-fatigue foam floor tile modules, to the method of manufacturing such floor tile modules, and to the method of using such floor tile modules, particularly when used in a complete, integrated anti-fatigue floor system comprising a plurality of the anti-fatigue floor modules or in combination with conventional carpet tiles.

A reinforced vinyl-foam, anti-fatigue floor module has been discovered which comprises a resilient foam layer having a face surface and a back surface. Typically, the foam layer has a foam density of over 20 pounds per cubic foot, such as for example, 20 to 40 pounds per cubic foot, and sufficient thickness to provide adequate cushioning, shock-absorbing and anti-fatigue properties, such as for example, 250 to 600 mils. The foam layer generally comprises a substantially closed cell foam layer, that is over about 80%, e.g. 90%, closed cells, so as to prevent the absorption of water into the vinyl foam layer and to provide for better cushioning. The vinyl-foam layer has a top and back surface very thin-skin layer. Generally, the top face surface of the anti-fatigue module has been embossed under heat and pressure so as to provide a decorative or a non-slip or other distinctive friction or design pattern thereon.

The anti-fatigue module contains a dimensionally stable reinforcing sheet material, such as scrim, or particularly a fibrous tissue sheet material comprised of glass fibers or polyester fibers or other polymeric or a combination, between the first and second foam layers to provide high dimensional stability with time to the module after production and embossing.

In one embodiment, the anti-fatigue foam floor module may comprise a first foam layer having a face surface and a second foam layer having a back surface with the first and second foam layers integrally and directly bonded to each other with a reinforcing material carefully positioned and bonded in between to impart a high degree of dimensional stability to the floor module.

The high degree of dimensional stability in a floor tile module is essential to the proper function and performance of the module while a high dimensional stability in a vinyl-foam, free lay mat or runner or a soft vinyl-foam gasket material is not a critical factor. Mats and runners used for floor surfaces are generally and merely placed on the floor as a free-laying mat and runner in areas where required. Unlike floor tile modules, which require careful and controlled edge matching with adjoining floor modules or with conventional carpet tiles, the mat and runner does not require edge match ups, since mats and runners are normally used alone. Furthermore, a vinyl-foam mat or runner normally will shrink with time, for example, up to about one percent or more, both in length and width. However, shrinkage in such mats and runners is not an essential factor because of the lack of need of edge match up and also because the mats and runners are fairly large and loosely laid on the floor, so minor variations are not noticed and do not affect the anti-fatigue mat or runner performance.

It has been discovered, both unexpectedly and surprisingly, that the employment of a reinforcing material within the foam layer of a floor module and its positioning is critical in order to provide a floor tile module of very high dimensional stability, and which floor tile module may be employed with other same or similar floor tile modules or in combination with other conventional carpet tiles. Further, surprisingly, it has been discovered that the reinforcing material cannot be merely placed in dead center in the anti-fatigue foam layer floor module. Rather, it has been discovered that the exact position and location of the reinforcing material is essential and critical to the dimensional stability and performance of the floor tile module, and that it is necessary to place the reinforcing and fibrous sheet material in a position of from 55% to 65% of the depth or thickness of the anti-fatigue foam floor tile module as measured from the back surface of the module in order to provide a module which lies flat after production and does not curl with time even through the floor tile module has had the face surface embossed which creates further stresses in the floor tile module.

The purpose of the reinforcing materials, such as the fiberglass scrim, or particularly the non-woven tissue material, is to stabilize the anti-fatigue foam module so that the shrinkage is controlled, typically to less than one-tenth of one percent, upon aging. The shrinkage control of the floor module is also important in that it allows the floor module to be accurately die cut and to obtain a floor module which will retain its dimensions when installed in a floor surface system. Obviously, anti-fatigue floor modules which are employed in a floor system with a shrinkage as high as one percent as runners and mats results in gaps and openings and would be totally unacceptable commercially. Therefore, the simple cutting up of normal foam anti-fatigue mats or runners into a floor tile module would not provide for a commercially acceptable product.

Normal vinyl-foam, anti-fatigue mats and runners, without the employment of a reinforcing material therein, do not exhibit a curl problem, but merely exhibit a shrinkage problem, which is not an essential factor for such mats and runners, since such mats and runners merely lay very flat on the floor. It has been found that when a reinforcing material such as a glass fiber sheet material is positioned within the foam layer of the foam module in order to provide dimensional stability, that is to prevent shrinkage, the exact position and location of the reinforcing sheet becomes very critical. For example, in the unembossed floor tile product, if the reinforcing material is placed closer to the face than to the back surface, then the floor tile material would dome, or curl downwardly. While if the reinforcing material is placed closer to the back than the face surface, an upward curl is exhibited upon shrinkage. Therefore, there is a need to balance the natural shrinkage of the vinyl-foam in the proper location of the reinforcing material. However, another factor is that the embossing of the face surface or the back surface of the floor tile module creates further stresses. Thus, it has been discovered that the position of placing the reinforcing material from 55% to 65% from the back surface of the floor tile module balances the effect both of the embossing and provides a dimensionally stable floor tile module which does not curl, with a dimensional stability when employing a fiberglass scrim or tissue material as a reinforcing material of less than from about one-tenth of one percent or less.

The principal application for the floor tile modules of the invention would be in those areas where a person is standing, such as a cashier, where a carpet tile can be replaced with the anti-fatigue floor tile modules. Obviously, a complete floor system could be made employing a plurality of the anti-fatigue floor tile modules placed together in an edge-matching relationship to cover the designated area. Also, the floor tile modules, because of the high dimensional stability, may be employed in combination with conventional carpet tiles replacing carpet tiles in a particular area where anti-fatigue properties are more desirable, such as for example, in convention booths, showrooms and in other places and areas where a high degree of floor comfort is needed, particularly where the floor system is or has to be removable. Generally, the dimensions of the tiles in the United States will be 18 inches by 18 inches which are the same size as the United States carpet tiles, while in Europe and in other areas, the conventional size of the floor tile modules would match that of the carpet tiles and would be 50 centimeters by 50 centimeters, representing the European and world-wide size standard.

Typically, the anti-fatigue module is embossed on one surface, such as the face surface, by passing the module under a roller with heat and pressure to impart an embossing on the surface. The embossed pattern may take various forms which may be decorative, non-slip or a combination. However, on embossing, the foam layer immediately under the face skin layer is densified due to such embossing.

It has been found that the employment of the reinforcing fibrous sheet material in the designated position causes the module to lie flat even through the module has been subject to additional strains through embossing on the face surface. When the embossing occurs on the back surface only to provide, for example, anti-friction propeties to the back surface, then the reinforcing material should be positioned 55% to 65% from the unembossed face surface.

The anti-fatigue module may also be an anti-static module where an electrically conductive module having an electrical resistivity of $1 \times 10^9$ ohm-square or less is desirable. Such modules are useful in static-free environments and usually areas where electronic components such as microchips and integrated circuits are subject to damage by static electricity. Anti-static modules are prepared by incorporating one or more anti-static agents into the vinyl-foam layer in an amount sufficient to lower the electrical conductivity of the vinly-foam and without reducing the cushioning properties of the module or abrasion-resistant characteristic of the face surface.

Suitable anti-static agents comprise, but are not limited to: carbon black particles such as furnace black particles; metal particles; polyalkylene glycols, such as polyethylene and polypropylene glycols; quaternay ammonium compounds such as di-alkyl benzyl, fatty or long-chain hydrocarbon quaternary ammonium halides; and particularly long-chain fatty acids and fatty acid esters and half esters of polyols, e.g. alkylene polyol, such as lauryl, oleate and other fatty or long-chain esters of polyethylene glycol and combinations thereof. The anti-static aqents are employed typically in an amount of from 1 to 20 parts, e.g. 2 to 10, per 100 parts of the vinyl resin.

The invention also concerns a method of preparing a foam anti-fatigue module. The reinforcing material may be positioned in the foam layer by a number of techniques, such as permitting the reinforcing material to penotrate a liquid, foamable plastisol layer to the desired location before heating, which creates difficulty in the exact positioning of the reinforcing material. The reinforcing material may be positioned by laminating two vinyl-foam layers, or a liquid, foamable plastisol layer, to a vinyl-foam layer with the reinforcing material therebetween.

One preferred method comprises forming a first layer of an expandable liquid vinyl plastisol composition by casting, e.g. 50 to 70 ounces per square yard, onto a support surface, such as a releasable paper sheet or a fluorocarbon-coated, teflon, fiberglass or stainless steel endless belt. A fibrous reinforcing sheet material, such as a glass fiber tissue (of non-woven glass fiber with a strengthening resin binder), is placed onto the top surface of the first plastisol layer permitting the glass fiber tissue to be wet by the plastisols or face. If desired, and optionally, the first layer may be heated to gel the layer or the top surface to control the position of the reinforcing sheet material.

This technique avoids the difficulties associated with trying to position accurately a fibrous sheet material by permitting penetration of a single layer of an expandable liquid vinyl resin plastisol. It is essential in the practice of the invention and to achieve the objects and results thereof to position accurately the fibrous sheet material.

A second layer of an expandable liquid vinyl resin plastisol, e.g. 30 to 40 ounces per square yard, which may be of the same density of same characteristics or different than the first layer is then formed by casting over the fibrous tissue sheet material on the first layer. Thereafter, the first and second foam layers containing the fibrous tissue sheet material are heated typically in an hot air oven or heated platens to gel the first and second layer, to expand the first and second layer and to form a substantially closed cell, integrally bonded, cushioning-type foam layer having a top and back surface thin-skin layer and having a foam density of 20 to 40 pounds per cubic foot and with the foam layer having a thickness of 250 to 600 mils, for example, 300 to 500 mils.

The fibrous sheet material is positioned in the foam layer at a position of 55% to 65% of the thickness of the layer from the back surface. Thereafter, the foam layer containing the fibrous tissue material embedded therein is embossed by passing over or through a heat and pressure roller so as to emboss the face surface of the foam layer which densifies the underlining foam beneath the embossed area, the embossed area generally ranging from about 10 to 150 mils in thickness. Thereafter, the embossed foam layer containing the fibrous, dimensionally stable sheet material therein is cut, usually by die cutting, into modules of desired size.

The vinyl resin plastisol or organosol compositions used in preparing the anti-fatigue floor modules generally comprise a vinyl-chloride, dispersion-type resin together with appropriate plasticizers, cell control agents, stabilizers, activators, chemical blowing agents, flame retardants, pigments, anti-static agents and the like and, optionally, solvents or diluents.

The fibrous reinforcing sheet material employed for preventing curl of the modules generally is composed of an open, very fibrous-type material, typically of a glass fiber or other inorganic or polymeric, such as polyester, olefins like polypropylene nylon and blends and combinations thereof. There are glass fiber scrims where there are regular and uniform openings of larger size as a woven glass fiber scrim, or more particularly and preferred is a glass fiber tissue composed of non-woven glass fibers and wherein both in the tissue and in the scrim are small amounts of a thermo-setting resin or other binders which are used to retain the glass fibers in place.

The invention will be described for the purposes of illustration only in connection with a particular embodiment of a vinyl-foam, reinforced anti-fatigue floor module. However, it is recognized that various changes and modifications and improvements may be made in the invention as illustrated, all falling within the spirit and scope of the invention as described and illustrated.

Plastisol formulation for use in preparing standard, i.e. non-anti-static and anti-static, anti-fatigue floor modules in accordance with the invention are as follows:

| Formulations for Anti-Fatigue Modules | | |
| --- | --- | --- |
|  | Standard | Anti-Static |
| Polyvinyl chloride resin (inherent viscosity ASTM D1243-60A) | 100 (0.92) | 100 (0.92) |
| CAC03 Filler Calcium Carbonate | 30.3 | 28.5 |
| Diisononyl phthalate (plasticizer) | 68.7 | 63.1 |
| Dibasiclead phthalate (plasticizer) | 3.09 | 2.82 |
| Azodicarbonamide (blowing agent | 1.85 | 1.48 |

| -continued | | |
| --- | --- | --- |
| Formulations for Anti-Fatigue Modules | | |
|  | Standard | Anti-Static |
| Colorants | as needed | as needed |
| Antimony Trioxide (flame retardant) | 0 | 2.93 |
| Anti-static agent-Markstat AL15[1] | 0 | 4.55 |

[1]Markstat is a trademark of Witco Argus Company

A first layer of the plastisol formulation is cast onto a release surface endless belt travelling at 13 feet per minute in an amount of 60 ounces per yard$^2$, a non-woven glass fiber tissue as a reinforcing sheet is laid onto the top surface of the first plastisol layer, a second plastisol layer is cast over the glass fiber tissue in an amount of 40 ounces per yard$^2$, and the plastisol layer heated in an oven set at 490° F. to provide a foamed, anti-fatigue sheet. The sheet is then heat-pressure embossed by passing over a roller to impart an anti-friction embossed surface to the face or top surface. Thereafter, on cooling, the foam material is die cut into floor modules of 18 inches by 18 inches. An anti-static floor module may be prepared by employing the anti-static plastisol formulation on the first, second, or typically to form both foam layers.

The vinyl-foam anti-fatigue modules prepared as described after production and after embossing, with time, lie flat and exhibit, with aging, about one-tenth of one percent, or less, shrinkage. It has been found that the vinyl-foam module is prepared in the same manner, however with the fibrous tissue material placed higher or lower than 55% to 65% permits curl and therefore is not acceptable.

Figure 1:
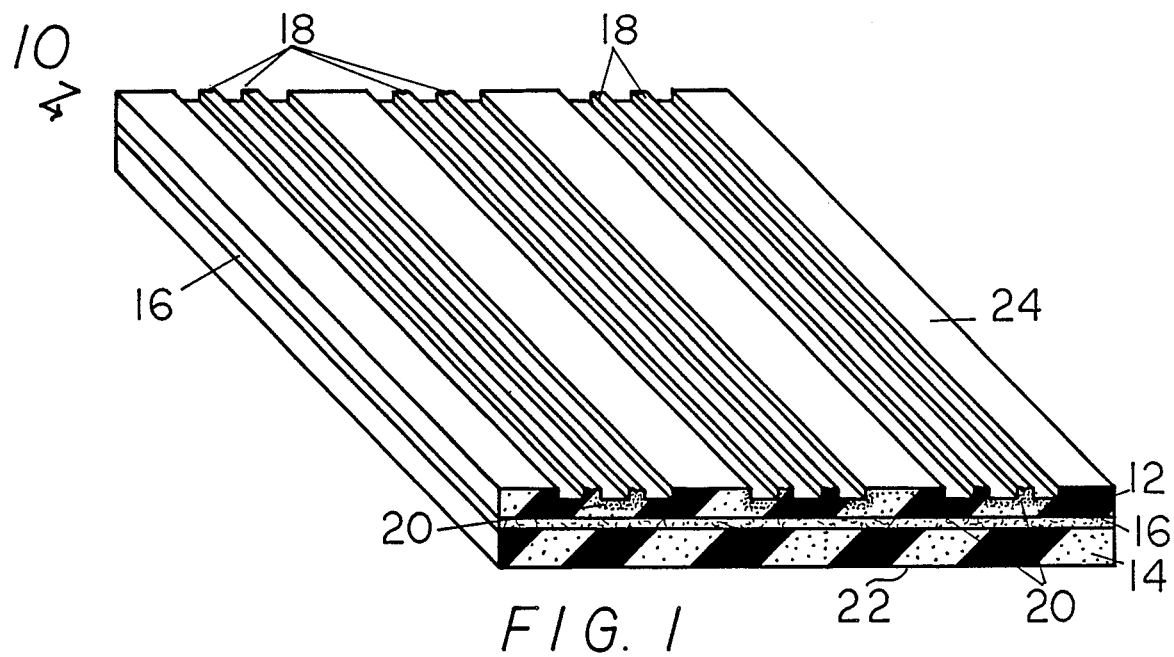
FIG. 1 is a perspective view of the vinyl-foam, anti-fatigue module of the invention.

FIG. 1 illustrates a reinforced, vinyl-foam, anti-fatigue module 10 of the invention and comprises a first top vinyl-foam layer 12, a second bottom vinyl-foam layer 14 integrally and directly bonded to the front layer 12 with a glass fiber tissue sheet material integrally bonded with the top 12 and bottom 14 foam layers and positioned 60% of the depth from the back surface of the module 10. The module 10 has a striated, non-slip-type embossed area 18 with a densified foam area 20 directly under the embossed area 18 with the vinyl-foam module having a thin back surface skin 22 and a front surface skin 24 formed of a thin, solid vinyl layer during manufacture.

Figure 2:
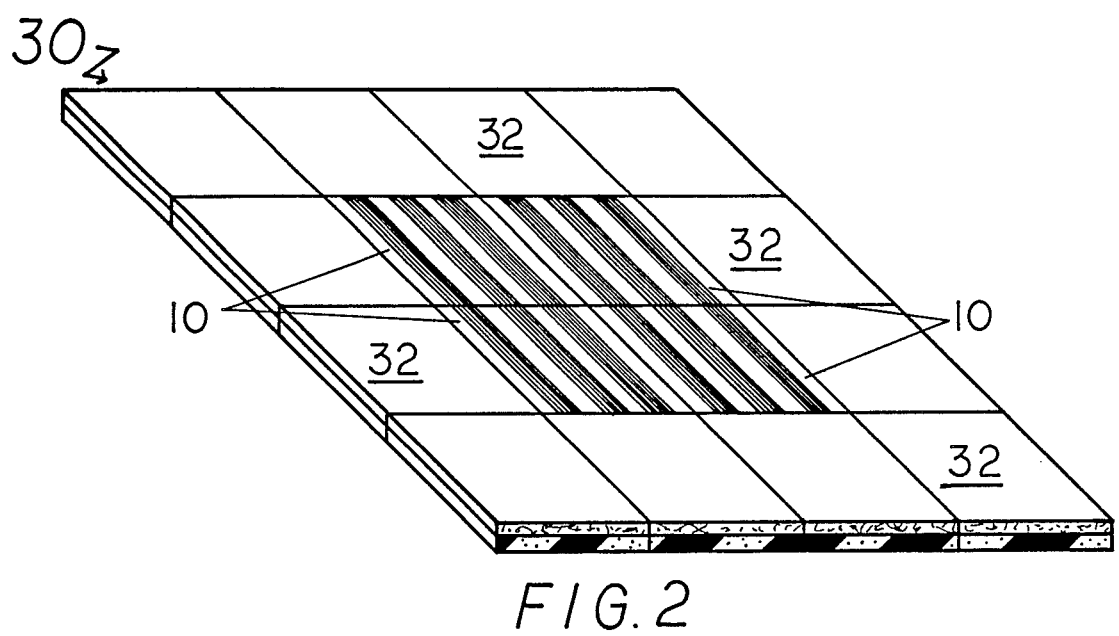
FIG. 2 is a perspective view of a flooring system showing the use of the modules of FIG. 1.

FIG. 2 illustrates a flooring system 30 wherein a plurality of conventional fibrous-face carpet tiles 32, e.g. tufted nylon face bitumen or polyvinyl chloride-backed carpet tiles, of conventional 18-inch-by-18-inch size are positioned edge-to-edge to form a flooring system to cover a defined floor area. A portion of the carpet tile system has been replaced with the anti-fatigue floor modules of FIG. 1 in an edge-to-edge relationship within the flooring system 30 to provide an anti-fatigue or also an anti-static area in the flooring system 30.

The anti-fatigue, dimensionally stable floor modules of the invention permit edge-to-edge matching with the modules or with conventional carpet tiles without curl or excess shrinkage.

What is claimed is:

1. A reinforced vinyl-foam, anti fatigue floor module of defined dimensions, which comprises:
    (a) a resilient, substantially closed cell, vinyl-foam layer of sufficient thickness to provide anti-fatigue cushioning properties, said layer having a face surface and a back surface, the foam layer having a density of about 20 pounds per cubic foot or more, and one surface having an embossed, anti-friction or design pattern thereon; and (b) a reinforcing fibrous sheet material within the foam layer and positioned between 55% to 65% of the depth of the foam layer from the non-embossed surface to provide a dimensionally stable floor module characterized by laying flat on a floor surface and which has a shrinkage of less than about two-tenths of one percent on aging.

2. The module of claim 1 wherein the foam layer of the module has a thickness of about 250 to 600 mils.

3. The module of claim 1 wherein the module has an embossed surface to a depth of about 10 to 150 mils of the foam layer.

4. The module of claim 1 wherein the foam density of the module foam layer ranges from about 20 to 40 pounds per cubic foot.

5. The module of claim 1 wherein the embossed surface comprises the face surface.

6. The module of claim 1 wherein the fibrous sheet material comprises a non-woven or woven glass fiber sheet material.

7. The module of claim 1 wherein the defined dimensions of the module are 18 inches by 18 inches or 50 centimeters by 50 centimeters.

8. The module of claim 1 wherein the module is an anti-static, anti-fatigue module, the foam layer containing an anti-static agent in an amount to provide an electrical resistivity of about $1 \times 10^9$ ohm-square or less.

9. The module of claim 8 wherein the anti-static agent comprises from about 1 to 20 parts by weight per 100 parts by weight of the vinyl foam layer, and the anti-static agent comprises a long-chain fatty acid; a fatty acid ester of an alkylene polyol, carbon black particles; a quaternary ammonium compound; a polyalkylene glycol or combinations thereof.

10. A floor covering system which comprises a floor surface covered by a plurality of the anti-fatigue floor modules of claim 1 the floor modules adjoining each other in a close, edge-to-edge matching floor covering relationship.

11. The floor covering system of claim 10 in which modules are a plurality of fibrous-face carpet tiles, the carpet tiles and floor modules, adjoining each other in a close, edge-to-edge matching floor covering relationship.

12. A reinforced, vinyl-foam, anti-fatifue floor module which module comprises in combination:

(a) a first resilient foam layer having a face surface;

(b) a second resilient, vinyl-foam layer integrally and directly bonded to the first foam layer, the second foam layer having a back surface, the first and second foam layers having a foam density of greater than 20 to 40 pounds per cubic foot and comprising substantially closed-cell foam to act as a vinyl-foam, anti-fatigue cushioning layer with a thickness of about 250 to 600 mils;

(c) a reinforcing fibrous sheet material comprising an open glass fiber tissue or scrim material between the first and second foam layers and positioned between 55% to 65% of the depth of the module from the back surface to provide a dimensionally stable and anti-fatigue floor module which lies flat and is characterized by a shrinkage, on aging, of less than about one-tenth of one percent; and (d) an embossed patterned face surface, the embossing to a depth of about 10 to 150 mils on the first foam layer, the first foam layer having densified foam areas under the embossed sections, and the pattern comprising a non-slip or design pattern thereon.

13. The module of claim 12 wherein one or both of the foam layers include an anti-static agent, and the module has an electrical resistivity of about $1 \times 10^9$ ohm-square or less.

14. A method of preparing a reinforced, vinyl-foam, anti-fatigue floor module, which method comprises:

(a) placing a reinforcing fibrous sheet material within a substantially closed cell, vinyl-foam layer, which layer has a face and a back surface, and having a foam density of about 20 pounds per cubic foot or more and of sufficient thickness to provide an anti-fatigue and cushioning layer;

(b) embossing a pattern on one of the surfaces of the foam layer;

(c) cutting the embossed, reinforced foam layer into floor modules of defined size; and (d) the reinforced sheet material position within the foam layer at a depth of from 55% to 65% of the thickness of the foam layer, measured from the non-embossed surface, thereby providing a floor module which has a high dimensional stability and lies flat during use and is characterized by less than two-tenths of one percent shrinkage, on aging.

15. The method of claim 14 wherein the reinforcing fibrous sheet material comprises a glass fiber, polyester fiber, olefin fiber, nylon fiber or blends thereof.

16. The method of claim 14 wherein the reinforcing sheet material comprises a non-woven glass fiber tissue material.

17. The method of claim 14 wherein the vinyl-foam layer includes an electrical conductive amount of an anti-static agent to provide a module having an electrical resistivity of about $1 \times 10^9$ ohm-square or less.

18. The method of claim 14 wherein the foam layer is formed by heat laminating two vinyl-foam layers together with the reinforcing sheet material laminated in between.

19. The method of claim 14 which includes placing the reinforcing material on a liquid, foamable vinyl plastisol layer and permitting the sheet material to penetrate the layer to the desired depth; and heating the plastisol layer to form the vinyl-foam layer.

20. The method of claim 14 which includes:

(a) casting a first layer of a liquid, foamable vinyl plastisol onto a release surface;

(b) placing the reinforcing sheet material onto the surface of the first layer;

(c) casting a second layer of a liquid, foamable vinyl plastisol onto the sheet material; and (d) heating the first and second layer to form the vinyl-foam layer.

21. The method of claim 20 which includes heating the first plastisol layer sufficient to gel the surface of the layer prior to or immediately after placing the reinforcing sheet material on the top surface of the first layer.

22. The method of claim 14 which includes die cutting the foam layer into floor modules having a size of 18 inches by 18 inches or 50 centimeters by 50 centimeters.

23. The method of claim 14 which includes embossing under heat and pressure the face surface of the foam layer to a depth of about 10 to 150 mils.

24. The floor module produced by the method of claim 14.

25. A method of preparing a reinforced, vinyl-foam, anti-fatigue floor module, which method comprises:
(a) forming a first layer of an expandable liquid vinyl resin plastisol composition;
(b) placing a fibrous reinforcing sheet material onto the top surface of the gelled first layer;
(c) forming a second layer of an expandable liquid vinyl resin plastisol composition over the fibrous sheet material;
(d) heating the first and second layers to form a substantially closed cell, integrally bonded, anti-fatigue, cushioning, vinyl-foam layer having a top and back skin layer surface, the foam layer having a foam density of greater than 20 to 40 pounds per cubic foot, and the foam layer having a thickness of about 250 to 600 mils, and the fibrous sheet material positioned 55% to 65% of the depth of the mat from the back surface of the foam layer; and
(e) embossing the top surface of the foam layer to form a decorative or non-slip friction pattern thereon; and
(f) die cutting the embossed foam layer into floor modules of defined size.

26. The method of claim 25 wherein the sheet material comprises a glass fiber, open scrim material or a non-woven, glass fiber tissue material.

27. The method of claim 25 wherein the sheet material is positioned about 60% of the depth of the mat from the back surface.

28. The method of claim 25 wherein the first or second resin plastisol composition or both include an anti-static agent.

29. The floor module produced the method of claim 25.

30. The module of claim 1 wherein the embossed pattern comprises a plurality of parallel striations embossed on the face surface of the module.

31. The method of claim 25 wherein the first layer comprises from about 50 to 70 ounces per square yard, and the second layer comprises from about 30 to 40 ounces per square yard.

32. A method of preparing a floor covering system, which method comprises:
installing on a substrate floor surface one or more modules of claim 1 in a close, edge-to-edge, floor covering relationship with a plurality of fibrous face carpet tiles to form a defined area of the modules on the substrate floor surface.

33. The method of claim 32 wherein the module comprises the module of claim 8.

* * * * *